(12) United States Patent
Howard

(10) Patent No.: US 6,694,318 B2
(45) Date of Patent: *Feb. 17, 2004

(54) SPLIT FILE SYSTEM

(75) Inventor: Michael L. Howard, Sandy, UT (US)

(73) Assignee: emWare, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/778,420

(22) Filed: Feb. 7, 2001

(65) Prior Publication Data

US 2001/0004738 A1 Jun. 21, 2001

Related U.S. Application Data

(63) Continuation of application No. 09/071,091, filed on May 1, 1998.

(51) Int. Cl.$^7$ ............................................. G06F 17/30
(52) U.S. Cl. ..................... 707/10; 707/203; 707/205; 709/217; 711/103; 715/511
(58) Field of Search .......................... 707/1, 5, 10, 101, 707/104.1, 200, 205, 204, 206; 715/506, 507, 511; 711/103, 111; 709/217

(56) References Cited

U.S. PATENT DOCUMENTS

| | | | |
|---|---|---|---|
| 5,201,044 A | 4/1993 | Frey, Jr. et al. ............. 395/575 |
| 5,280,603 A | 1/1994 | Jeppson et al. ............. 395/425 |
| 5,403,639 A | * 4/1995 | Belsan et al. ............... 707/204 |
| 5,422,763 A | 6/1995 | Harris ........................ 360/51 |
| 5,437,010 A | 7/1995 | Blackman et al. .......... 395/161 |
| 5,469,354 A | * 11/1995 | Hatakeyama et al. .......... 707/3 |
| 5,469,557 A | 11/1995 | Salt et al. ................... 395/425 |
| 5,606,705 A | 2/1997 | Randall et al. ............. 395/800 |
| 5,608,898 A | 3/1997 | Turpin et al. ............... 395/619 |
| 5,623,600 A | 4/1997 | Ji et al. .................. 395/187.01 |
| 5,632,681 A | 5/1997 | Bakoglu et al. ............... 463/44 |
| 5,668,897 A | * 9/1997 | Stolfo ........................ 382/283 |
| 5,682,497 A | 10/1997 | Robinson ..................... 711/103 |
| 5,694,608 A | 12/1997 | Shostak ....................... 395/767 |
| 5,734,886 A | 3/1998 | Grosse et al. ............... 395/604 |

(List continued on next page.)

FOREIGN PATENT DOCUMENTS

| EP | 0 526 034 | 9/2000 |
| EP | 0 798 656 | 1/2003 |

OTHER PUBLICATIONS

"Launching Storage–Area Net," Mary Jander, *Data Communications*, pp. 64–72, Mar. 21, 1998.

"Performance Evaluation of Switched Fibre Channel I/O System Using —FCP for SCSI," Steven Emerson, IEEE, pp. 479–484, Feb. 1995.

(List continued on next page.)

*Primary Examiner*—Shahid Alam
(74) *Attorney, Agent, or Firm*—Madson & Metcalf

(57) ABSTRACT

A file system for a collection of data files on a microcontroller-based device, the microcontroller-based device including an arithmetic/logic unit, read/write memory, and program memory, and the file system comprising a data table stored in the program memory and a document table of contents stored on a host computer. The data table is a set of data files, and the document table of contents includes length and offset information for each data file. A method is also described for creating and managing a file system for a collection of data files on a microcontroller-based device, wherein the microcontroller-based device includes an arithmetic/logic unit, read/write memory, and program memory, wherein the method comprises the steps of providing a data table for storage in the program memory and providing a document table of contents for storage on a host computer.

2 Claims, 3 Drawing Sheets

U.S. PATENT DOCUMENTS

| | | | |
|---|---|---|---|
| 5,790,198 A | | 8/1998 | Roop et al. .................. 348/460 |
| 5,802,553 A | | 9/1998 | Robinson et al. ............ 711/103 |
| 5,826,261 A | | 10/1998 | Spencer .......................... 707/5 |
| 5,832,508 A | | 11/1998 | Sherman et al. ............. 707/200 |
| 5,870,764 A | | 2/1999 | Lo et al. ....................... 707/203 |
| 5,918,228 A | | 6/1999 | Rich et al. ..................... 707/10 |
| 5,940,853 A | | 8/1999 | Ooi et al. ..................... 711/111 |
| 5,987,549 A | * | 11/1999 | Hagersten et al. ........... 710/107 |
| 6,012,085 A | * | 1/2000 | Yohe et al. .................. 709/217 |
| 6,279,096 B1 | * | 8/2001 | McCoy et al. ............... 711/211 |
| 6,292,802 B1 | * | 9/2001 | Kessenich et al. ........... 707/101 |
| 6,301,707 B1 | * | 10/2001 | Carroll et al. ................ 717/177 |
| 6,330,566 B1 | * | 12/2001 | Durham ................... 707/104.1 |

OTHER PUBLICATIONS

"Fibre Channel Overview," Zoltan Meggyesi, Research Institute for Particle and Nuclear Physics, pp. 1–9, Aug. 15, 1994.

"Implementing a Fibre Channel SCSI Transport," Robert Snively, IEEE, pp. 78–82, Feb. 28, 1994.

The Changing Nature of Disk Controllers, Andrew D. Hospodor, IEEE, vol. 81, No. 4, Apr. 1993.

"Disk Evaluation Using Flash Memory," Amir Friedman, IEEE Nonvolatile Memory Technology Review, pp. 61–65, 1993.

* cited by examiner

SPLIT FILE SYSTEM

CROSS-REFERENCE TO RELATED APPLICATION

This application is a continuation of U.S. patent application Ser. No. 09/071,091 filed May 1, 1998.

FIELD OF THE INVENTION

This invention relates generally to file systems for microcomputer-based devices having limited system resources and in particular to data files used to specify and create interfaces for microcomputer-based devices acting as specialized web servers, and is more particularly directed toward a method and system that places a minimum set of software routines for accessing the microcomputer-based system's data store within the embedded controller itself, while placing all higher level software components of a file system within a host computer.

BACKGROUND OF THE INVENTION

In general, the term "embedded system" connotes a combination of computer hardware and software that forms a component of some larger system. Embedded systems are intended to operate without intervention by the larger system of which they form a part, and without the need for frequent control or supervisory inputs from any source. Embedded systems are usually of simple design, and often do not include mass storage components or complex peripherals.

Embedded systems have been placed in vending machines to provide a simple computer network interface to report the need for service or vended product replenishment. Some copying machines in the office environment also utilize embedded systems for reporting of operational status, and embedded systems have been suggested in television set-top boxes designed to provide Internet web browser features through the viewer's television set.

Embedded systems that are accessible over computer networks may be configured, for example, as specialized web servers designed for Internet access. In general, this web server function is restricted to embedded device interface. But the device must usually be able to supply data files used to specify and create interfaces.

In order to minimize space required for storing data files within the limited non-volatile memory of an embedded system, which would generally be limited to a few thousand bytes (8-bit memory locations) of EEPROM (electrically erasable, programmable read-only memory), a few fixed-length data files with a fixed address table could be provided. This type of data structure still requires storage space for the address table and a minimal file access utility (a READ routine, for example) to access the stored data.

While this stripped-down data structure may be adequate for some application, it lacks the flexibility to operate in an environment where data files may need to be altered, removed, or added. Accordingly, a need arises for a flexible file system designed to operate in conjunction with a microcomputer-based system having limited storage capability. Such a file system should provide a range of file system services while preserving as much as possible of the embedded system's storage capability for the data files themselves.

SUMMARY OF THE INVENTION

These needs and others are satisfied by the method of the present invention for a file system for a collection of data files on a microcontroller-based device, the microcontroller-based device including an arithmetic/logic unit, read/write memory, and program memory, and the file system comprising a data table stored in the program memory and a document table of contents stored on a host computer. The data table is a set of data files, and the document table of contents includes length and offset information for each data file.

In one aspect of the invention, the set of data files may be a concatenated set of compressed data files. The file system may further comprise means for accessing the document table of contents on the host computer to retrieve the length and offset information and means for retrieving the desired data file using the retrieved length and offset information.

In one form of the invention, at least one of the collection of data files may be a rich text document, such as an HTML document, although this is not a requirement for a system in accordance with the invention.

In accordance with another aspect of the invention, a method is described for creating and managing a file system for a collection of data files on a microcontroller-based device, wherein the microcontroller-based device includes an arithmetic/logic unit, read/write memory, and program memory. The method comprises the steps of providing a data table for storage in the program memory and providing a document table of contents for storage on a host computer.

The step of providing a data table further comprises the steps of compressing each file in a set of desired files and concatenating the compressed files to form the data table. The document table of contents includes file length and file offset information.

In accordance with one form of the invention, a desired file is accessed by the steps of retrieving length and offset information relating to the desired data file from the document table of contents on the host computer and accessing the desired data file in the program memory using the retrieved length and offset information.

In another form of the invention, a file system is provided having software components distributed over a computer network, wherein one element of the computer network is a microcontroller-based device including an arithmetic/logic unit, read/write memory, program memory, and non-volatile memory, and another element of the computer network is a host computer system. The file system comprises a collection of data files stored in the non-volatile memory of the microcontroller-based device, byte-oriented non-volatile memory access routines stored in the program memory of the microcontroller-based device, and file-oriented access routines stored on the host computer, wherein the file-oriented access routines provide directory and file manipulation capability for the data files stored in the non-volatile memory of the microcontroller-based device.

The data files in the non-volatile memory of the microcontroller-based device are configured as an array of writable blocks. The memory access routines described in conjunction with the file system may comprise a read routine that reads a range of memory locations from the non-volatile memory and a write routine that writes to a single memory location.

A start address and a number of memory locations to be read may be passed to the read routine as parameters, while a memory address and a value to be written may be passed to the write routine as parameters.

In yet another form of the invention, a method is described for creating and managing a file system having software components distributed over a computer network, wherein one element of the computer network is a microcontroller-based device including an arithmetic/logic unit, read/write memory, program memory, and non-volatile memory, and another element of the computer network is a host computer system. The method comprises the steps of providing a collection of data files stored in the non-volatile memory of the microcontroller-based device, providing byte-oriented non-volatile memory access routines stored in the program memory of the microcontroller-based device, and providing file-oriented access routines stored on the host computer. The collection of data files stored in the non-volatile memory of the microcontroller-based device may be a collection of compressed data files.

In yet another aspect of the present invention, a method is provided for maintaining a file system for one or more files stored in non-volatile memory of a microcontroller-based device, wherein the microcontroller-based device is in communication with a host computer over a computer network. The method comprises the steps of providing byte-oriented non-volatile memory access routines stored in the program memory of the microcontroller-based device, providing, on the host computer, file-oriented access routines, and maintaining, on the host computer, a directory and a free block list characterizing the files stored on the microcontroller-based device and the file storage space available.

Updating a file stored on the microcontroller-based device further includes the steps of maintaining, on the host computer, a copy of the file to be updated, compressing the copy of the file, determining file length, examining the free block list to determine whether number of block required for file storage has changed, and, if so, modifying the free block list to reflect new block allocation, storing the file in blocks as allocated in the free block list, updating a directory entry corresponding to the file being updated, and writing the file to the microcontroller-based device utilizing the byte-oriented access routines in the program memory of the microcontroller-based device. This process may further include the step of updating a transaction counter stored both on the microcontroller-based device and on the host computer.

In still another form of the invention, a file system comprises a data table stored in memory associated with a device and a software module on a host computer system interconnected with the device, wherein the software module interprets the data table. The table may be grouped into logical blocks of data, while the logical blocks may comprise an arrangement including a directory structure, a free block list, and sequences of blocks that store contents of a file.

Further objects, features, and advantages of the present invention will become apparent from the following description and drawings.

DETAILED DESCRIPTION OF THE INVENTION

Figure 1:
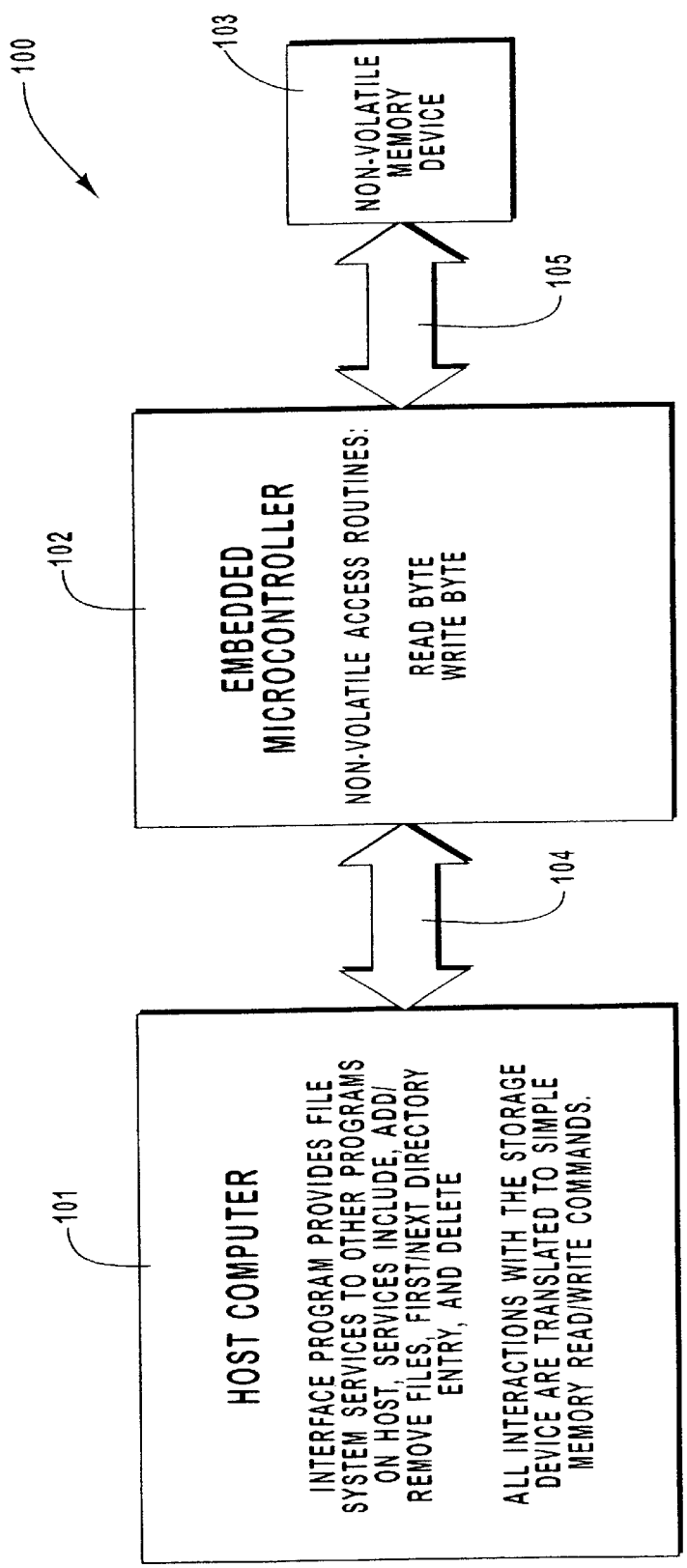
FIG. 1 illustrates, in block diagram form, the general structure and operation of a split file system in accordance with the present invention.

In accordance with the present invention, a methodology and system for providing file system services for embedded systems is described that provide distinct advantages when compared to those of the prior art.

One method for storing files on an embedded device, which could be termed static document storage, creates a file system at the time the firmware of the embedded system is created, presumably on a development system by the system developer as is well-known in the art. This is accomplished by placing the embedded system data files into a single target directory on the development system computer and executing a utility program that compresses each of the files in the directory, then concatenates the files into a single large data table.

The compression technique used may be any suitable file compression scheme, but is preferably based up a Lempel-Ziv (LZ) substitutional compression, as is well-known in the art. In the preferred form of the invention, the compression is a variant of the Storer/Szymanski scheme in which a window of predetermined size is maintained in conjunction with a look-ahead buffer, and additional dynamic Huffman compression is applied to the basic compressor output. This is known as LZH compression.

The data table described above is added to the program in the embedded device firmware. The offset and length of each file are stored in the embedded device as a static document table of contents. This static document table of contents is also retained by the host computer. This process creates a complete, although primitive, file system on the target system so that document access does not require host participation.

The static document storage technique described above has the advantage that it prevents files from being corrupted or altered. This same characteristic can become a liability, however, should a file require alteration for a legitimate reason. Reasons for updating a data file may include, for example, updating a user interface for a different language, or correcting an error in the interface program. The static technique also uses the microcontroller's program memory for document data storage, and program memory is generally in short supply in a microcontroller-based system.

To overcome these difficulties, the split file system allows for dynamic document storage by placing most of the file system on the host computer 101 and using the non-volatile memory 103 associated with the embedded device for storage of document data. In general, a file system is a module that breaks up a storage device into blocks that are in turn logically related into files. The purpose of this decomposition of the storage device into blocks is to provide a pool of storage units from which to allocate strings of blocks of file data. The individual blocks may be allocated and deleted as needed without affecting neighboring blocks that may be associated with other files.

The blocks are allocated and deleted by the file system as files are created, destroyed, or resized. These operations are made possible by a data structure that records the files currently stored in the file system, and the sequence of data blocks that represents the contents of each of the files. Thus, a file system takes a fixed size storage space and allows files (whose lengths are generally unknown a priori) to be added and removed without requiring that all the other files on the storage device be moved in order to make room, or that any gaps that may be left by any missing files be closed.

A file system module that provides the above-described capabilities can be quite large in terms of code space required to implement it. A typical robust file system uses ten times the code space that is available on most single chip micro-controllers.

The environment in which the present invention is designed to operate contemplates that the embedded system will be connected to a host computer. This interconnection of embedded system and host may occur in the context of a web browser/web server connection commonly encountered during Internet operation, but the interconnection is not limited to this Internet scenario.

The present invention addresses the above-described file system size problem by moving the file system code onto the host computer that is connected to the embedded device. The embedded device simply provides a section of memory, typically on serial EEPROM, and low-level routines to read and write this memory. The remainder of the file system software, such as that required to provide a completely dynamic document storage capability (including, for example, the capability to add and remove files at run time) resides on the host computer. This means that the device contains all the files and data that comprise a file system, but there is little or no overhead for the file system within the embedded device.

Of course, the end result of placing the file system utilities on the host computer instead of the embedded system is that the embedded system (or "embedded device") cannot "understand" the contents of portions of it's own memory. This has little or no effect on device operation, however, since the files and data that reside in this portion of memory are actually used only by the host computer to interface with the embedded system, so the device does not require access to its own data files without the help of the host.

FIG. 1 illustrates, in block diagram form, the general structure and operation of a split file system in accordance with the present invention, generally depicted by the numeral 100. An embedded microcontroller 102 stores files and data within an associated non-volatile memory device 103.

The embedded device 102 may be a thermostat, for example, designed to be controlled via an Internet connection. Since Internet operation supports a wide variety of graphics-rich display modes, a graphical interface with the thermostat would be a desirable feature. A thermostat control panel could be represented as an HTML (Hypertext Markup Language) file stored within the embedded device 102. If a web browser attempts to load the control panel, the HTML file is retrieved from the device 102 through the intervention of the host computer 101. The host 101 provides file system services both to other programs that may be running on the host, or to programs running remotely through a network such as the Internet.

It should be noted that the file format for data storage on the embedded device 102 is not limited to HTML, but may be any format that provides adequate functionality. Similarly, the present invention is not limited to operation over the Internet, but may be used for communication between systems that are directly connected, systems that are part of a private local or wide-area network (an Intranet connection), or for systems that communicate via the Internet.

As noted above, in the split file system environment, the host computer provides file system services to other programs on the host, and to programs running remotely on a computer network. These services include, but are not limited to: INSERT FILE, DELETE FILE, READ DIRECTORY, UPDATE DIRECTORY, and READ FILE. At a minimum, the device itself must contain non-volatile memory access routines that allow individual bytes to be written to and read. These low-level routines may be termed READ BYTE and WRITE BYTE. For the sake of convenience, and if memory limitations allow, additional routines that permit the reading and writing of a range of bytes in the non-volatile memory may be provided. The ability to read and write a range of bytes enhances data transfer rate.

Figure 2:
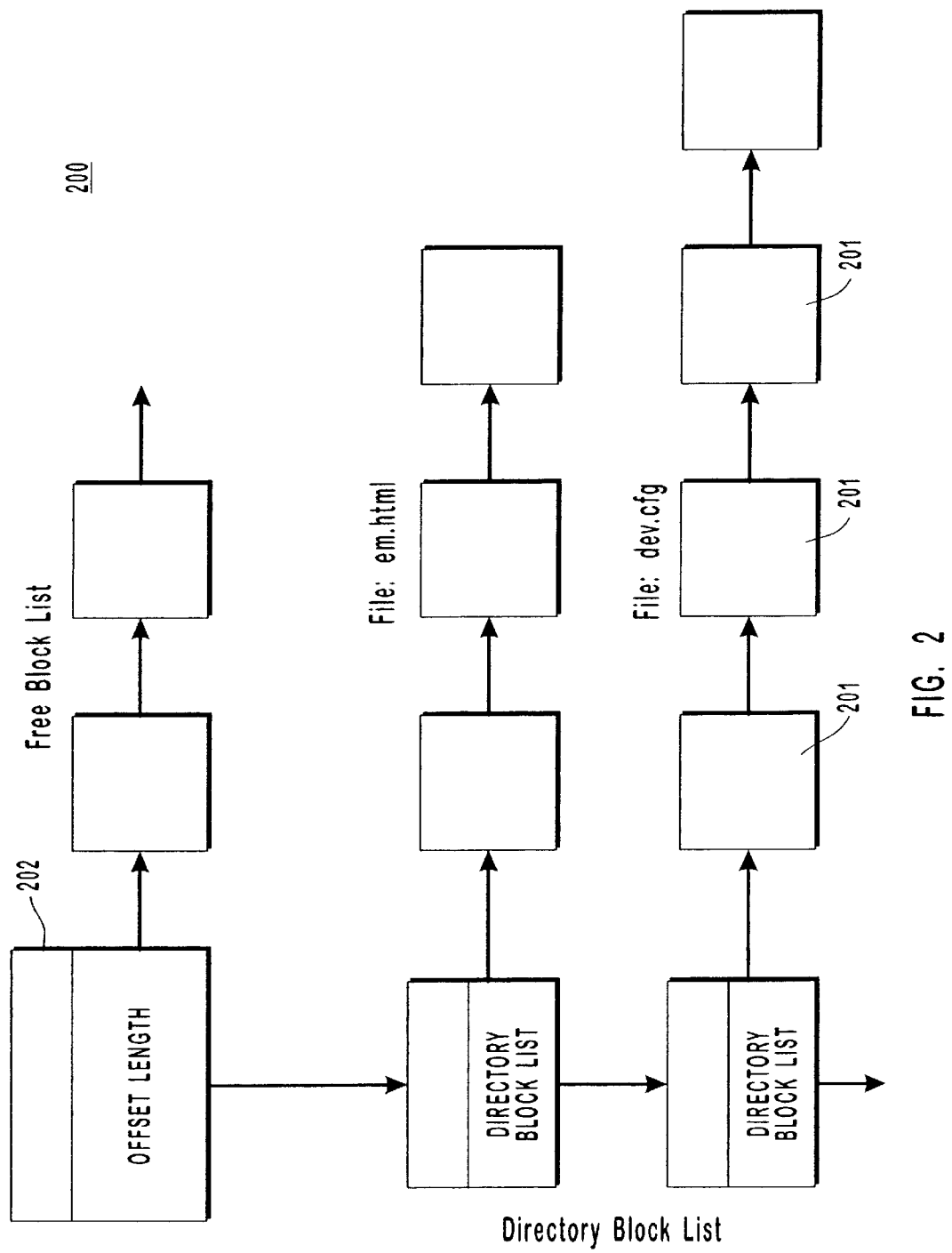
FIG. 2 depicts the data organization of a split file system in accordance with the present invention.

FIG. 2 depicts the data organization of a split file system in accordance with the present invention, and is generally depicted by the numeral 200. The file system 200 is implemented in an array of writable blocks 201. The first block after the file system header 202 is the first directory block, and each block contains a pointer to the next block. A free block pointer in the header points to the first free block. Each file corresponding to a directory entry has a pointer to the first block of the file, and, just as in the directory structure, each allocated block of a file includes a pointer to the next block.

Figure 3:
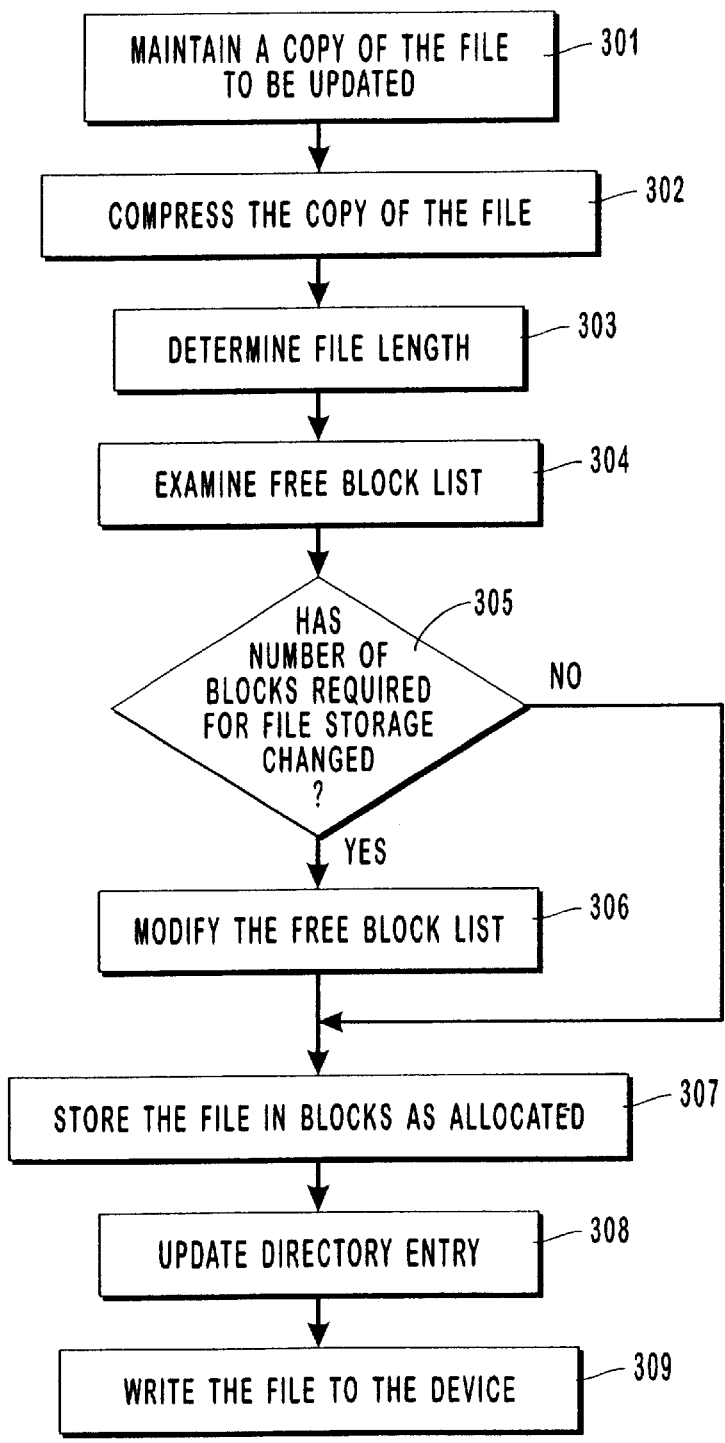
FIG. 3 is a flow chart of a method for maintaining a file system for one or more files stored in non-volatile memory of a microcontroller-based device in accordance with the present invention.

FIG. 3 is a flow chart of a method for maintaining a file system in accordance with the present invention, and is particularly directed toward maintaining a file. A copy of the file to be updated is generally maintained, as indicated in block 301. This file copy is generally kept in the memory of the host system.

In the subsequent step (302), the file copy is compressed using a suitable compression scheme as discussed previously. Next, in step 303, the file length is determined. The free block list is then examined in step 304 to determine whether the number of blocks required for file storage has changed.

If so, execution proceeds in block 306 as the free block list is modified to reflect the new block allocation. In the next step (307), the file is stored in blocks as allocated in the free block list. This is the same step (307) where execution resumes if the number of blocks required for storage has not changed. In other words, the free block list is not modified if the number of blocks required for file storage has not changed.

In the subsequent step (308), the directory entry for the file is updated. Then, in step 309, the file is written to the microcontroller-based device utilizing the byte-oriented access routines in the program memory of the device.

In addition to presenting an innovative solution to the problem of creating and managing a file system for a small, embedded device, the above-described system and methodology also anticipates and provides solutions to other potential problems.

First, since the connection to an embedded device may be a tenuous one (via telephone line or RF modem, for example), the embedded device may lose its connection with the host system. If communication were interrupted during file system operations, the file system could be corrupted. In the file system invention described, a local copy of the file system is kept on the host computer. All modifications to the file system are performed on this local copy, and the modified regions are not transmitted to the embedded device until the local copy is ready. A transaction counter at both the local and remote ends provides a way for the file system software to check whether the device has been successfully updated to reflect the latest file system state. And, in the event of communication disruption, the host system can check to see if it should complete a previously failed file system update.

Another problem that may arise in connection with the establishment of a file system associated with an embedded device is the high rate of state changes that could occur during modification of the non-volatile memory during a typical modification session. Since most EEPROMs permit only a finite (albeit large) number of write operations, the permissible write count could be exceeded in a relatively short time. To avoid this pitfall, write operations to the device memory are deferred by setting a flag in the split file system driver. The flag is set at the beginning of a modification session (telling the driver not to synchronize transactions), then cleared when the local copy of the file system is in the desired final state. This technique results in reduced communication traffic during development and update, as well as reducing the total write count of EEPROMs used for storage.

Finally, since memory in the embedded device is often at a premium, internal fragmentation resulting from fixed length block size is eliminated by using a "squeeze" function to resize all file storage blocks to exactly the size needed for data storage. This is similar to the cluster resize operation of some software products, but different because the block size itself is modified to fit exactly rather than simply to fit better.

The concept of a split file system also includes the logical concatenation of files in the device, as described above, with a set of files on the host computer which are associated with the device. A set of files on the host may be identified as follows:

c:\emware\dev\myhvac\foo.html c:\emware\dev\myhvac\pigs.bin

In device memory, the following files may be stored:

Start.html ex11.html

As seen from a client, the entire collection of files would be available as:

foo.html pigs.bin

Start.html ex11.html

There have been described herein a protocol and methodology for information interchange for embedded systems communicating over computer networks that are relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A method for maintaining a file system for one or more web page files stored in non-volatile memory of a microcontroller-based device, wherein the microcontroller-based device is in communication with a host computer over a computer network to provide access to the one or more web page files from a web browser communicating with the host computer via the Internet, wherein updating a file stored on the microcontroller-based device includes the steps of:

(a) providing byte-oriented non-volatile memory access routines stored in the program memory of the microcontroller-based device;

(b) providing, on the host computer, file-oriented access routines;

(c) maintaining, on the host computer, a directory and a free block list characterizing the files stored on the microcontroller-based device and the file storage space available, wherein web page files are retrieved from the device through the host computer;

(d) maintaining, on the host computer, a copy of the file to be updated;

(e) compressing the copy of the file;

(f) determining file length;

(g) examining the free block list to determine whether number of block required for file storage has changed; and, if so (h) modifying the free block list to reflect new block allocation;

(i) storing the file in blocks as allocated in the free block list;

(j) updating a directory entry corresponding to the file being updated; and (k) writing the file to the microcontroller-based device utilizing the byte-oriented access routines in the program memory of the microcontroller-based device.

2. The method in accordance with claim 1, further comprising the step of updating a transaction counter stored both on the microcontroller-based device and on the host computer.

* * * * *